May 10, 1949.  W. A. LEDWITH  2,469,734

BEARING AND SEAL ASSEMBLY FOR TURBINES

Filed Aug. 23, 1944  2 Sheets-Sheet 1

May 10, 1949. W. A. LEDWITH 2,469,734
BEARING AND SEAL ASSEMBLY FOR TURBINES
Filed Aug. 23, 1944 2 Sheets-Sheet 2

INVENTOR
Walter A. Ledwith

Patented May 10, 1949

2,469,734

UNITED STATES PATENT OFFICE 2,469,734

BEARING AND SEAL ASSEMBLY FOR TURBINES

Walter A. Ledwith, Hartford, Conn., assignor to United Aircraft Corporation, East Hartford, Conn., a corporation of Delaware Application August 23, 1944, Serial No. 550,888

10 Claims. (Cl. 308—36.1)

This invention relates to a bearing and seal assembly for an elastic fluid turbine.

Turbines generally have labyrinth seals between the bearings for the turbine rotor and the power section of the turbine. The seal elements have been separate from the bearing and have been separately mounted on the rotor and in the housing. A feature of this invention is a compact bearing and seal assembly permitting mounting of these elements as a unit in the turbine structure.

Another feature is the inclusion in the bearing and seal assembly of a thrust bearing which resists the axial thrust exerted on the rotor during turbine operation.

Another feature is the alignment of the main bearing and the thrust bearing in a unitary assembly.

The assembly may include a sleeve fitting on the rotor shaft and providing a bearing surface and another sleeve on the shaft having a number of sealing elements thereon. A feature of this invention is the use of interengaging face splines for holding these sleeves against relative rotation and to permit easy assembly of the parts.

Other objects and advantages will be apparent from the specification and claims, and from the accompanying drawings which illustrate an embodiment of the invention.

Figure 1:
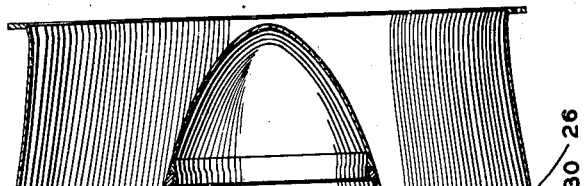
Fig. 1 is a sectional view through the turbine.

The turbine includes a casing 10 and rotor 12 both supported in a housing 14. The casing is supported by radially extending pins 16 carried by the housing and engaging bores in bosses 18 on the casing. These pins are all in substantially the same plane and constitute the sole support for the casing so that the casing is free to expand lengthwise. In the plane of the pins the casing is smaller than the housing and clearance is provided at the inner ends of pins 16 to permit the casing to expand radially.

Housing 14 has a head 20 which forms a part of the housing and supports a bearing 22 for the front end of the turbine shaft 24 forming an integral part of the rotor. At the other end of the housing a spider 26 supports a bearing 28 for the turbine shaft. The spider has a number of legs 30 engaging radially positioned pins 32 carried by the housing.

Casing 10 is built up of several rings 34, 36, 38 and 40, each of which has a single row of nozzle forming guides 42. These rows of guides alternate with rows of blades 44 on the rotor. Bosses 18 are all on ring 36 so that the supporting pins all engage the same ring. An inlet scroll 46 directs the driving fluid through the row of nozzles on the face casing ring 34, and an exhaust duct 48 guides the driving fluid from the last row of blades on the rotor.

Figure 2:
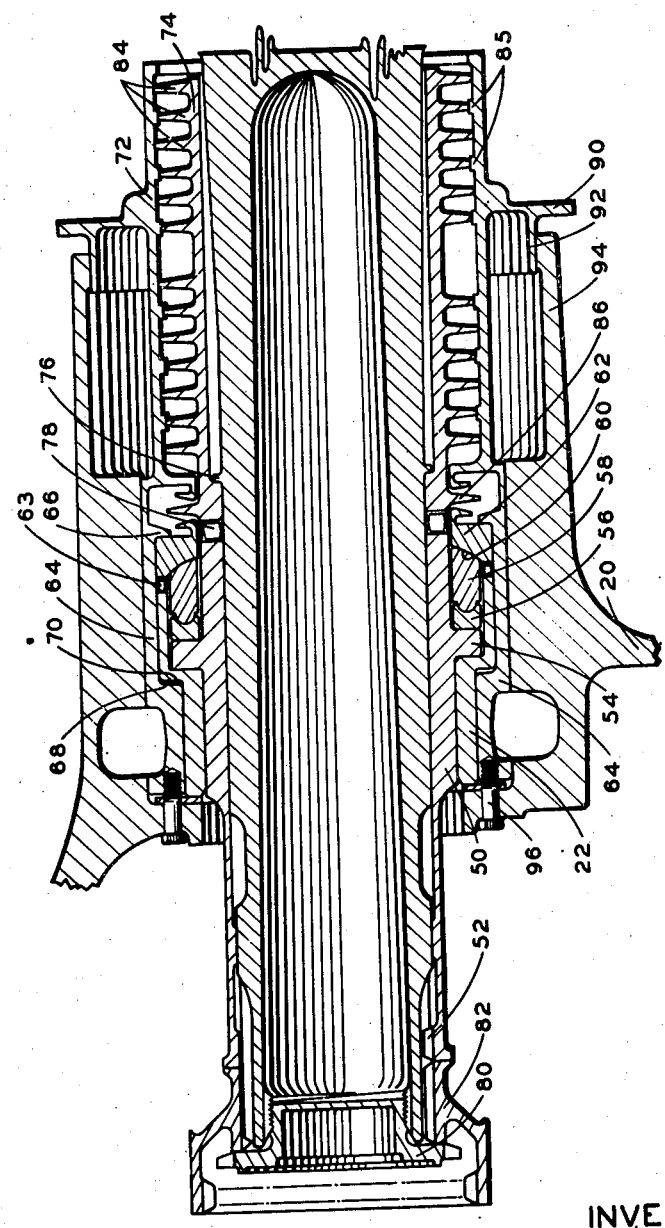
Fig. 2 is a fragmentary sectional view on a larger scale of the front bearing and seal assembly.

The front bearing and seal are assembled as a unit. As shown in Fig. 2 the bearing 22, which may be continuous, engages with a sleeve 50 which fits over the turbine shaft. Interengaging splines 52 on the outer end of the sleeve and the shaft prevent relative rotation. Sleeve 50 forms a bearing surface for the turbine shaft and has a projecting rib 54, one surface of which engages with the end of the bearing 22 and the other surface of which engages with a number of bearing shoes 56. These shoes are supported by projections on a ring 58 which has a spherical surface 60 engaging with a bearing block 62 surrounding the sleeve 50. Ring 58 and block 62 may be continuous. Block 62 and bearing 22 may have interengaging face splines 63 to prevent relative rotation.

The bearing 22 and the bearing block 62 are carried by a supporting sleeve 64 which has a projecting rib 66 engaging the block 62 and a shoulder 68 which may engage a cooperating shoulder 70 on bearing 22. Sleeve 64 is split longitudinally to permit assembly over the bearings and bearing block.

The sleeve 64 has integral therewith the outer element 72 of the labyrinth seal which is located between the bearing and the power section of the turbine. This outer element is in the form of a sleeve which is spaced from an inner sleeve 74 mounted on the turbine shaft. The sleeve 74 is held against a shoulder 76 on the shaft and is caused to rotate with the shaft by interengaging face splines 78 on the end of sleeve 74 and the bearing sleeve 50. Sleeves 74 and 50 are held in position on the shaft by a ring 80 threaded in the end of the shaft and clamping a collar 82 against the end of sleeve 50.

Sleeve 74 has a number of spaced outwardly extending sealing elements 84 cooperating with ribs 85 on the inner surface of the sleeve 72 to prevent leakage of power fluid from the power section of the turbine. Sleeve 74 also may have an integral oil slinger ring or flange 86 located adjacent to bearing block 62 to prevent the flow of oil along the surface of sleeve 74 and into the seal. It may be noted that sleeve 74 is spaced from the turbine shaft except at its outer end, thereby to limit the transfer of heat directly from the rotor to said sleeve.

A flexible seal 88 extends from an outwardly projecting rib 90 on the outer seal element 72 to the inner periphery of the first stage nozzle ring 34 to prevent leakage of power fluid. The element 72 may also have a laterally projecting flange 92 fitting in and guided by a sleeve 94 forming an integral part of the head 20 of housing 14. In assembly, the bearing 22 together with bearing blocks 56, ring 58 and block 62 are mounted on sleeve 50, and sleeve 74 is placed in alignment with sleeve 50. The outer supporting sleeve 64, which, as above stated, is split longitudinally, is then placed over the remaining parts of the assembly and the entire assembly may then be mounted as a unit in a cylindrical recess in the head 20 or on the turbine shaft. The assembly may be locked in position in head 20 by bolts 96 which extend through a part of the head and into the supporting sleeve 64.

It is to be understood that the invention is not limited to the specific embodiment herein illustrated and described, but may be used in other ways without departure from its spirit as defined by the following claims.

I claim:

1. A bearing assembly for supporting a turbine rotor in a housing including a sleeve adapted to be mounted on the rotor shaft, said sleeve having a substantially cylindrical bearing surface and a projecting flange, a main bearing surrounding the bearing surface on said sleeve, a stationary bearing support for said bearing adapted to be mounted in the turbine housing, and a thrust bearing ring carried by said stationary support and carrying shoes engaging one side of said flange, all of said parts being continuous annular elements except for the stationary bearing support and the shoes, 2. A bearing and seal assembly including a sleeve adapted to be positioned on a rotating shaft, said sleeve having a number of sealing elements thereon, another sleeve adapted to be mounted on said shaft and having a bearing surface, a bearing around said second sleeve, and a support for said bearing, said support having an integral extension with sealing elements cooperating with the sealing elements on said first sleeve, in combination with a thrust bearing supported against axial movement by said support, said another sleeve having means thereon engaging axially with said thrust bearing.

3. A bearing and seal assembly including a sleeve adapted to be positioned on a rotating shaft, said sleeve having a number of sealing elements thereon, another sleeve adapted to be mounted on said shaft and having a bearing surface, a bearing around said second sleeve, and a support for said bearing, said support having an integral extension with sealing elements cooperating with the sealing elements on said first sleeve, in combination with a thrust bearing supported against axial movement by said support, said second sleeve having a projecting flange with which the thrust bearing engages.

4. A bearing and seal assembly for a turbine having a rotor and a surrounding housing, said assembly including a sleeve adapted to be mounted on the rotor shaft and having a projecting flange, another sleeve forming an extension of said first sleeve and having a number of sealing elements thereon, a bearing engaging said first sleeve, a thrust bearing engaging said flange, and a support for said bearing and said thrust bearing, said support having means cooperating with the sealing elements on said second sleeve.

5. A bearing and seal assembly for a turbine having a rotor and a surrounding housing, said assembly including a sleeve adapted to be mounted on the rotor shaft and having a projecting flange, another sleeve forming an extension of said first sleeve and having a number of sealing elements thereon, a bearing engaging said first sleeve, a thrust bearing engaging said flange, and a support for said bearing and said thrust bearing, said support having means cooperating with the sealing elements on said second sleeve, said support being adapted to be positioned axially within said housing.

6. A bearing and seal assembly for a turbine having a rotor and a surrounding housing, said assembly including a sleeve adapted to be mounted on the rotor shaft and having a projecting flange, another sleeve forming an extension of said first sleeve and having a number of sealing elements thereon, a bearing engaging said first sleeve, a thrust bearing engaging said flange, and a support for said bearing and said thrust bearing, said support having means cooperating with the sealing elements on said second sleeve, said support being adapted to be positioned axially within said housing, and means for securing said support within said housing.

7. A bearing and seal assembly including a rotating shaft, a sleeve mounted on the shaft, means on said shaft for limiting the axial movement of the sleeve in one direction, said sleeve having a number of axially spaced outwardly extending radial sealing elements thereon, a second sleeve adapted to be mounted on said shaft in endwise engagement with the first sleeve, said second sleeve having a bearing surface, a continuous annular bearing around the bearing surface on said second sleeve, a stationary support for said bearing, said support having an integral substantially cylindrical extension with axially spaced inwardly extending radial sealing elements cooperating with the sealing elements on said first sleeve, said support being split for assembly over the sealing elements on the sleeve, and means for clamping said second sleeve axially against said first sleeve and said first sleeve against said means on said shaft.

8. A bearing and seal assembly including a rotating shaft, a sleeve mounted on the shaft, means on said shaft for limiting the axial movement of the sleeve in one direction, said sleeve having a number of axially spaced outwardly extending radial sealing elements thereon, a second sleeve adapted to be mounted on said shaft in endwise engagement with the first sleeve, said second sleeve having a bearing surface, a continuous annular bearing around the bearing surface on said second sleeve, a stationary support for said bearing, said support having an integral substantially cylindrical extension with axially spaced inwardly extending radial sealing elements cooperating with the sealing elements on said first sleeve, in combination with means for clamping both of said sleeves on the shaft and for holding said first sleeve against said means on said shaft.

9. A bearing and seal assembly including a rotating shaft, a sleeve mounted on the shaft, means on said shaft for limiting the axial movement of the sleeve in one direction, said sleeve having a number of axially spaced outwardly extending radial sealing elements thereon, a second sleeve adapted to be mounted on said shaft in endwise engagement with the first sleeve, said second sleeve having a bearing surface, a continuous annular bearing around the bearing surface on said second sleeve, a stationary support for said bearing, said support having an integral substantially cylindrical extension with axially spaced inwardly extending radial sealing elements cooperating with the sealing elements on said first sleeve, said support being split for assembly over the sealing elements on the sleeve, and means for clamping said second sleeve axially against said first sleeve and said first sleeve against said means on said shaft, said first sleeve being spaced from the shaft except at the end adjacent to said second sleeve, and said limiting means on said shaft being located adjacent to the end of the first sleeve adjacent to said second sleeve.

10. A bearing and seal assembly including a rotating shaft, a sleeve mounted on the shaft, means on said shaft for limiting the axial movement of the sleeve in one direction, said sleeve having a number of axially spaced outwardly extending radial sealing elements thereon, a second sleeve adapted to be mounted on said shaft in endwise engagement with the first sleeve, said second sleeve having a bearing surface, a continuous annular bearing around the bearing surface on said second sleeve, a stationary support for said bearing, said support having an integral substantially cylindrical extension with axially spaced inwardly extending radial sealing elements cooperating with the sealing elements on said first sleeve, said sleeve having interengaging face splines to prevent relative rotation, and one of said sleeves being splined to the shaft, said support being split for assembly over the sealing elements on the sleeve, and means for clamping said second sleeve axially against said first sleeve and said first sleeve against said means on said shaft.

WALTER A. LEDWITH.

REFERENCES CITED

The following references are of record in the file of this patent:

UNITED STATES PATENTS

| Number | Name | Date |
|---|---|---|
| 1,158,424 | Banner | Nov. 2, 1915 |
| 1,762,117 | Dahlstrand | June 3, 1930 |
| 1,918,988 | Searles et al. | July 18, 1933 |
| 1,971,547 | White | Aug. 28, 1934 |
| 2,040,218 | Soderberg | May 12, 1936 |